United States Patent
Shibuno

(10) Patent No.: US 8,761,591 B2
(45) Date of Patent: Jun. 24, 2014

(54) INTERCHANGEABLE LENS, AND CAMERA BODY WHICH HAS THE INTERCHANGEABLE LENS ATTACHED THERETO AND CAN CONTROL THE INTERCHANGEABLE LENS

(75) Inventor: Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 13/425,686

(22) Filed: Mar. 21, 2012

(65) Prior Publication Data

US 2012/0243856 A1    Sep. 27, 2012

(30) Foreign Application Priority Data

Mar. 23, 2011    (JP) .................................. 2011-063806

(51) Int. Cl.
*G03B 17/00*    (2006.01)
*G03B 3/00*    (2006.01)

(52) U.S. Cl.
USPC ............................................ 396/76; 396/137

(58) Field of Classification Search
USPC ............................................ 396/76, 137, 103
See application file for complete search history.

(56) References Cited

U.S. PATENT DOCUMENTS

| | | | | |
|---|---|---|---|---|
| 4,816,860 A * | 3/1989 | Iida et al. | | 396/80 |
| 5,274,409 A | 12/1993 | Tokumaru et al. | | |
| 5,420,721 A * | 5/1995 | Kanno et al. | | 359/697 |
| 6,731,339 B2 * | 5/2004 | Ohkawara | | 348/347 |
| 7,590,339 B2 * | 9/2009 | Kurosawa | | 396/76 |
| 7,805,068 B2 * | 9/2010 | Sato et al. | | 396/373 |
| 2010/0238321 A1 | 9/2010 | Honjo et al. | | |
| 2011/0109784 A1 * | 5/2011 | Akiyama | | 348/333.06 |
| 2012/0075508 A1 * | 3/2012 | Shintani | | 348/251 |

FOREIGN PATENT DOCUMENTS

| | | |
|---|---|---|
| JP | 3-98005 | 4/1991 |
| JP | 4-151127 | 5/1992 |
| JP | 11-125860 | 5/1999 |
| JP | 2008-26553 | 2/2008 |
| WO | 2009/041063 | 4/2009 |

OTHER PUBLICATIONS

Digital Photography Review: "Canon EOS C300 interchangeable lens unit video camera", Nov. 4, 2011.*

* cited by examiner

*Primary Examiner* — Rochelle-Ann J Blackman
*Assistant Examiner* — Linda B Smith
(74) *Attorney, Agent, or Firm* — Panasonic Patent Center

(57) ABSTRACT

An interchangeable lens attachable to a camera body includes a first operable member, a second operable member, an operation member for receiving user's operation for the first operable member or the second operable member, an obtaining unit configured to obtain, from the camera body, selection information for selecting the operable member to be assigned to the operation member, and a controller configured to make the operation member function as a member for operating either one of the first operable member and the second operable member based on the selection information.

8 Claims, 10 Drawing Sheets

Fig. 4

(A) MZ AND MF SUPPORTING CAMERA BODY

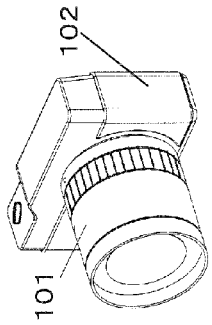

CAMERA BODY WHICH SUPPORTS BOTH THE MANUAL ZOOM CONTROL AND THE MANUAL FOCUS CONTROL OF ATTACHED ELECTROMOTIVE INTERCHANGEABLE LENS.

(B) MZ SUPPORTING CAMERA BODY

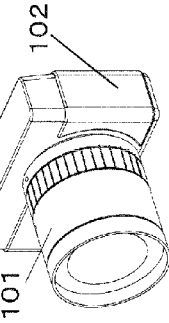

CAMERA BODY WHICH SUPPORTS ONLY THE MANUAL ZOOM CONTROL OF ATTACHED ELECTROMOTIVE INTERCHANGEABLE LENS.

(C) MF SUPPORTING CAMERA BODY

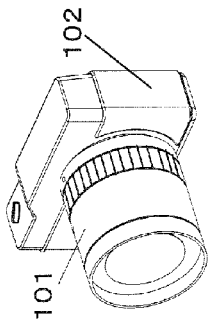

CAMERA BODY WHICH SUPPORTS ONLY THE MANUAL FOCUS CONTROL OF ATTACHED ELECTROMOTIVE INTERCHANGEABLE LENS.

(D) MZ AND MF NON-SUPPORTING CAMERA BODY

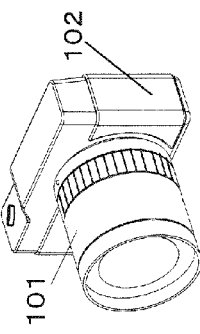

CAMERA BODY WHICH SUPPORTS NEITHER THE MANUAL ZOOM CONTROL NOR THE MANUAL FOCUS CONTROL OF ATTACHED ELECTROMOTIVE INTERCHANGEABLE LENS.

INTERCHANGEABLE LENS, AND CAMERA BODY WHICH HAS THE INTERCHANGEABLE LENS ATTACHED THERETO AND CAN CONTROL THE INTERCHANGEABLE LENS

BACKGROUND

1. Technical Field

The technical field relates to an interchangeable lens and a camera body, and more particularly to an interchangeable lens and a camera body which drive and control an operational object in the interchangeable lens.

2. Related Art

Conventional interchangeable lens units have adopted a mechanism for mechanically driving an optical system including a focus lens and a zoom lens. In contrast to that type of lens, another type of an interchangeable lens unit has been recently proposed which electrically, instead of mechanically, drives an optical system by an electric actuator such as a motor (for example, refer to WO2009/041063A1).

It is expected that an interchangeable lens unit which drives each component of an optical system, such as a focus lens and a zoom lens, by an electric actuator, such as a motor, enables unprecedented drive control for lens.

Here, the interchangeable lens unit which enables manual zoom and manual focus has two operation members with which a user performs the zoom operation and focus operation, respectively.

Such two operation members lead a problem of increased production cost and difficulty of miniaturizing the conventional interchangeable lens unit.

In view of the above problems, an interchangeable lens is provided which has a more compact structure, enabling easier operation for the user, and a camera body is provided to which such an interchangeable lens can be attached.

SUMMARY

In a first aspect, an interchangeable lens attachable to a camera body includes a first operable member, a second operable member, an operation member for receiving user's operation for the first operable member or the second operable member, an obtaining unit configured to obtain, from the camera body, selection information for selecting the operable member to be assigned to the operation member, and a controller configured to make the operation member function as a member for operating either one of the first operable member and the second operable member, based on the selection information.

In a second aspect, a camera body is provided, to which an interchangeable lens is attachable. The interchangeable lens includes a first operable member, a second operable member, an operation member for receiving user's operation for the first operable member or the second operable member, an obtaining unit configured to obtain, from the camera body, selection information for selecting the operable member to be assigned to the operation member, and a controller configured to make the operation member function as a member for operating either one of the first operable member and the second operable member based on the selection information. The camera body comprises a sending unit configured to send the selection information to the obtaining unit.

According to the above aspects, when the interchangeable lens which has an operation member to be used for operating at least one of the two operable members is attached to the camera body, the controller of the interchangeable lens assigns the function of operating either the first operable member or the second operable member to the operation member based on the selection information sent by the sending unit of the camera body. With this arrangement, by changing the operating function to be assigned to one of the operable members as required, two operable members can be operated with a single operation member. Therefore, it is enough to provide one operation member of the interchangeable lens for operating two operable members, the structure of the interchangeable lens can be simplified or miniaturized. Further, since the possibility of erroneous operation can be reduced by the configuration of the interchangeable lens having only one operation member, the operation of the interchangeable lens is simplified.

BRIEF DESCRIPTION OF DRAWINGS

FIGS. 4A, 4B, 4C, and 4D are diagrams for describing classification by the supporting function of a camera body.

DETAILED DESCRIPTION OF PREFERRED EMBODIMENTS

Embodiments of the present invention will be described below with reference to the accompanying drawings.

1. Configuration 1-1. Overall Configuration

The configuration of a digital camera 100 of a first embodiment will be described.

Figure 1:
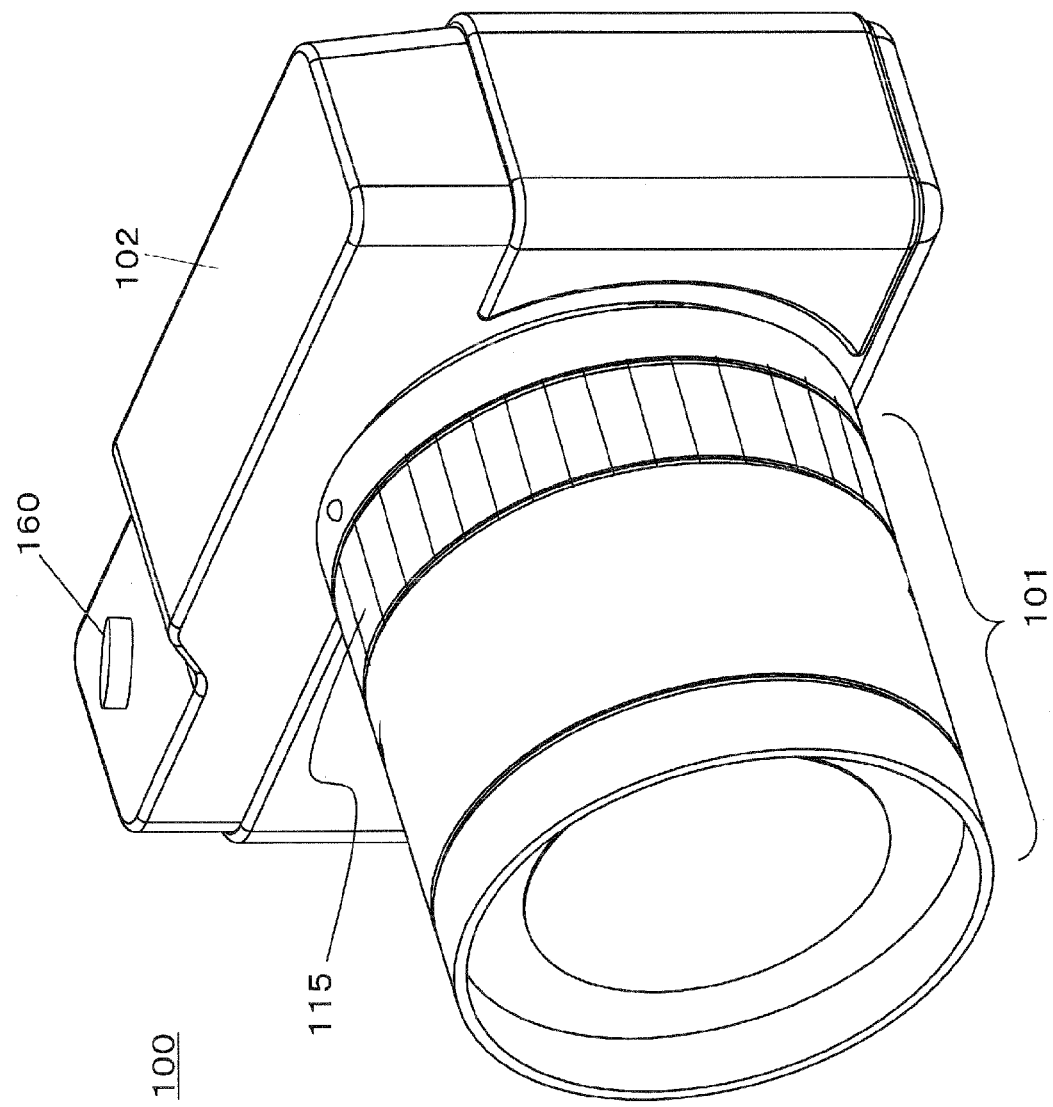
FIG. 1 is an external view of a digital camera.

As shown in FIG. 1, the digital camera 100 includes an electromotive interchangeable lens 101, and a camera body 102 to which the electromotive interchangeable lens 101 can be attached. The electromotive interchangeable lens 101 has an operation ring 115. The operation ring 115 is assigned a function of operating a zoom lens or a function of operating a focus lens based on a focus mode set by the camera body 102. The focus mode includes a manual focus mode (hereinafter, referred to as 'MF mode') in which the user manually sets the focus, and an autofocus mode (hereinafter, referred to as 'AF mode') in which the camera body 102 automatically sets the focus. The camera body 102 has a release button 160. In response to receiving the user's operation on the release button 160, the camera body 102 can send a control signal to the attached electromotive interchangeable lens 101 to make it perform an autofocus operation, or perform a shooting operation on a subject image formed through the electromotive interchangeable lens 101.

Figure 2:
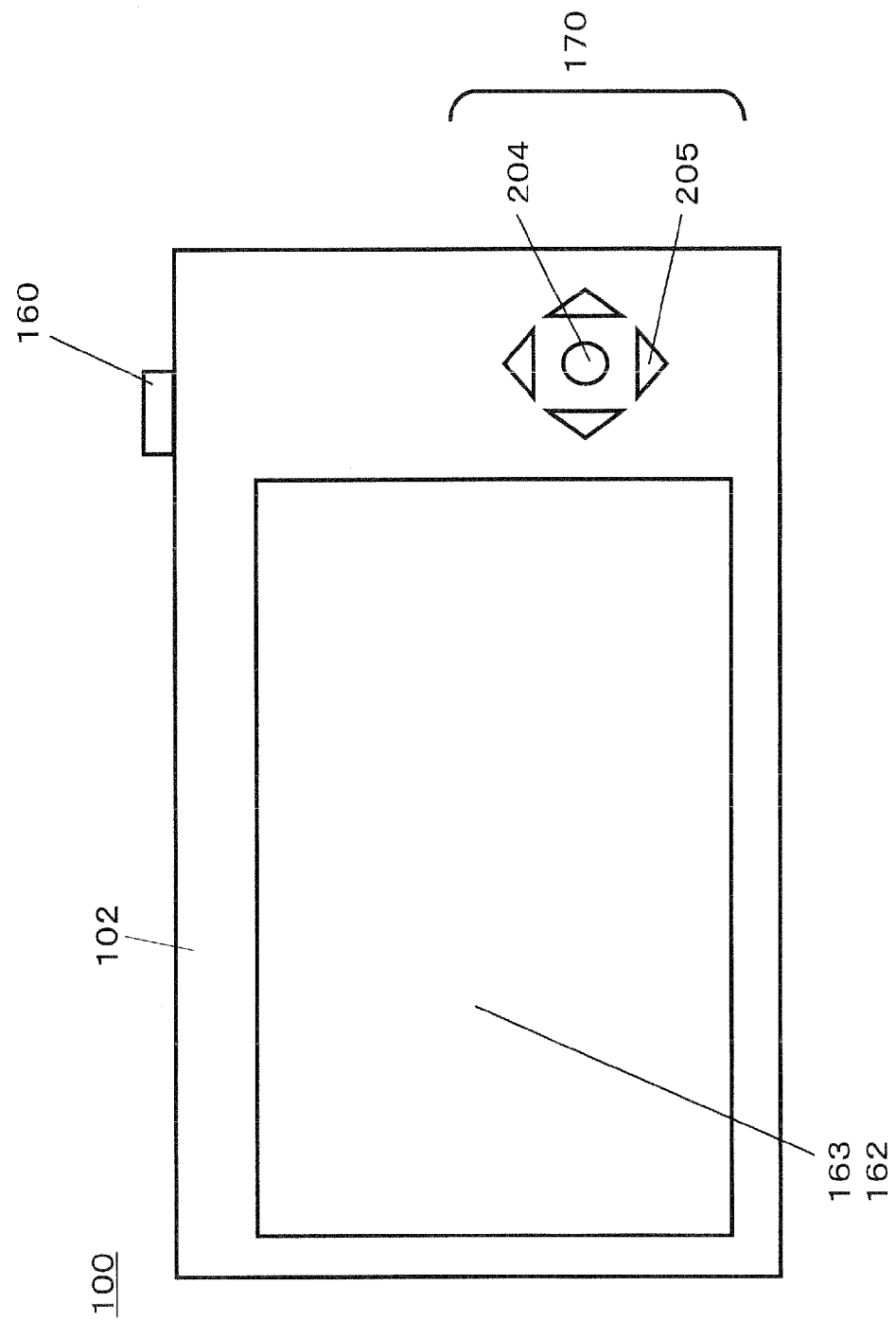
FIG. 2 is a rear view of the digital camera.

As shown in FIG. 2, the camera body 102 has a liquid crystal display monitor 163, a touch panel 162, a camera side operation unit 170 including a center button 204 and directional buttons 205, and the like on the back of the camera body. In response to receiving the user's operation on the touch panel 162 or the camera side operation unit 170, the camera body 102 can perform respective types of control according to the user's operation.

Figure 3:
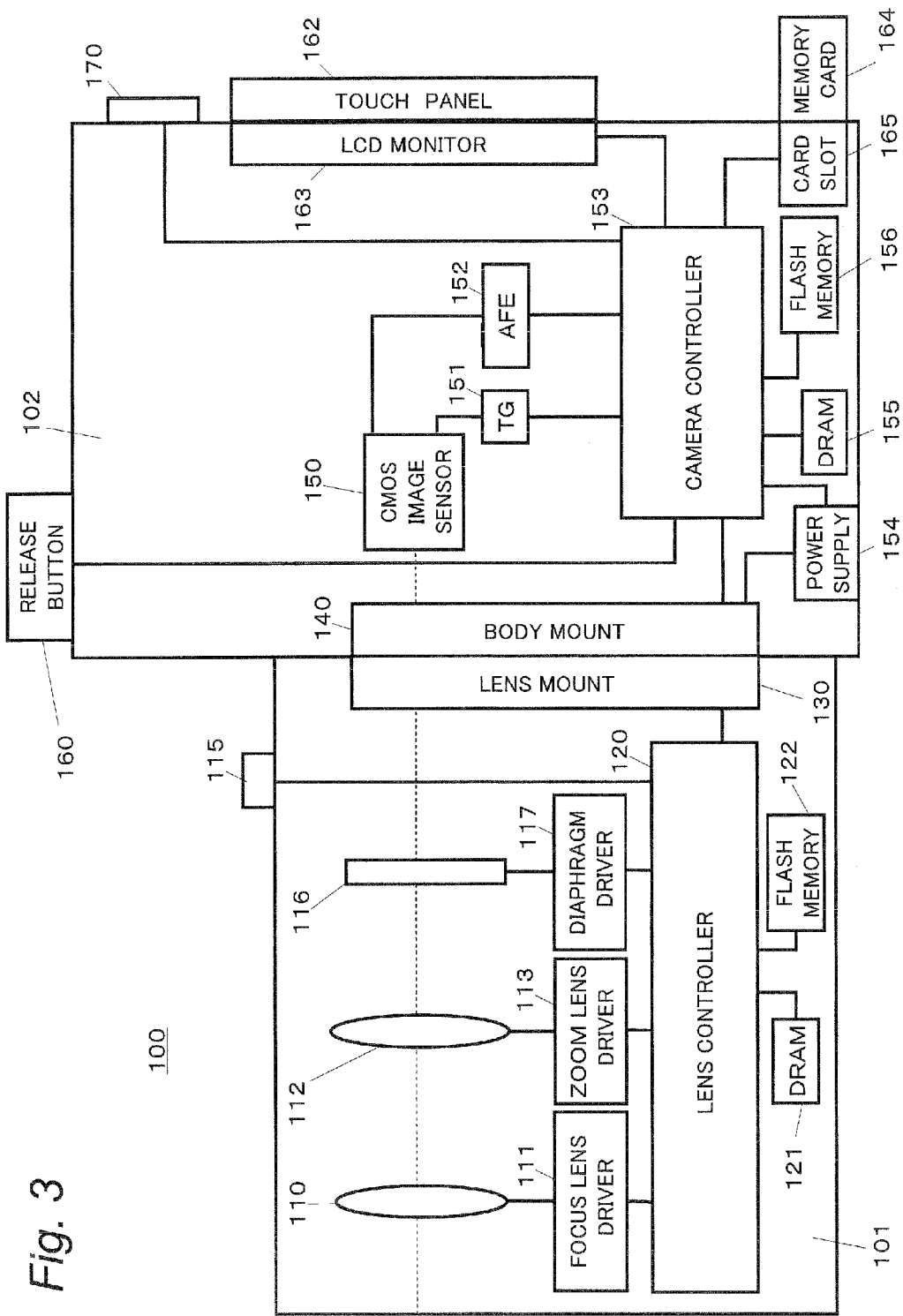
FIG. 3 is an electrical block diagram of the digital camera.

FIG. 3 is an electrical block diagram of the digital camera. The configurations of the camera body 102 and the electromotive interchangeable lens 101 will be described below with reference to FIG. 3.

1-2. Configuration of Electromotive Interchangeable Lens

The configuration of the electromotive interchangeable lens 101 will be described.

The electromotive interchangeable lens 101 has a lens controller 120, a lens mount 130, an optical system including a focus lens 110 and a zoom lens 112, a focus lens driver 111, a zoom lens driver 113, a diaphragm 116, a diaphragm driver 117, an operation ring 115, a DRAM 121, and a flash memory 122.

The lens controller 120 controls each of components of the electromotive interchangeable lens 101. The lens controller 120 can control the drivers (the focus lens driver 111, the zoom lens driver 113, the diaphragm driver 117) of respective operable members (objects to be driven according to user's operation or system control) to drive the operable members of the focus lens 110, the zoom lens 112, and the diaphragm 116 in response to the user's operation on the operation ring 115. The lens controller 120 is connected to the DRAM 121 and the flash memory 122. The lens controller 120 can write/read information to/from the DRAM 121 and the flash memory 122 as required. The lens controller 120 can also communicate with a camera controller 153 through the lens mount 130 and a body mount 140. The lens controller 120 may be composed of a hardwired electronic circuit, a microcomputer using a program, or the like.

The lens mount 130 is a connection member for mechanically and electrically connecting the electromotive interchangeable lens 101 to the camera body 102 in cooperation with the body mount 140 of the camera body 102. When the electromotive interchangeable lens 101 and the camera body 102 are mechanically and electrically connected, the lens controller 120 and the camera controller 153 can communicate with each other.

The DRAM 121 is used as a work memory for the lens controller 120 in the respective types of control. The flash memory 122 stores a program, parameters, lens data and the like used by the lens controller 120 in the respective types of control.

The focus lens 110 is a lens for changing the focus state of a subject image incident on the optical system of the electromotive interchangeable lens 101 and formed on a CMOS image sensor 150. The focus lens 110 may be composed of any number of lenses or any groups of lenses. The focus lens driver 111 drives the focus lens 110 to move forward and backward along the optical axis of the optical system according to a control signal sent from the lens controller 120. The focus lens driver 111 may be implemented by, for example, a stepping motor, a DC motor, an ultrasonic motor or the like.

The zoom lens 112 is a lens for changing the magnification of a subject image formed on the optical system of the electromotive interchangeable lens 101. The zoom lens 112 may be composed of any number of lenses or any groups of lenses. The zoom lens driver 113 drives the zoom lens 112 to move forward and backward along the optical axis of the optical system according to the control signal sent from the lens controller 120. The zoom lens driver 113 may be implemented by, for example, a stepping motor, a DC motor, an ultrasonic motor or the like.

The diaphragm 116 is formed of mechanical blades operable to open and close. The diaphragm 116 is an adjusting member for adjusting an amount of light incident through the optical system of the electromotive interchangeable lens 101. The diaphragm driver 117 changes the open/close state of the mechanical blades of the diaphragm 116 according to the control signal sent from the lens controller 120. The diaphragm driver 117 may be implemented by, for example, a stepping motor, a DC motor, an ultrasonic motor or the like.

The operation ring 115 is an operation member installed on the outer surface of the electromotive interchangeable lens 101. The operation ring 115 is adapted to rotate relatively to the electromotive interchangeable lens 101. The rotation position and the rotation speed of the operation ring 115 are detected by a detection unit (not shown) and sent to the lens controller 120. The lens controller 120 can supply a drive control signal to the driver of the operable member according to the received rotation position and the rotation speed of the operation ring 115. The electromotive interchangeable lens 101 contains the operable members such as the focus lens 110, the zoom lens 112, and the diaphragm 116.

The operable member to be assigned to the operation ring 115 is not fixed and can be changed. That is, the assignment of the operation on the operation ring 115 to the function of driving the operable member is changed by the lens controller 120 or the camera controller 153 as required to meet the condition. When the focus lens 110 is assigned to the operation ring 115 as the operable member, the lens controller 120 supplies a drive control signal to the focus lens driver 111 to drive the focus lens 110 in response to the operation on the operation ring 115. When the zoom lens 112 is assigned to the operation ring 115 as the operable member, the lens controller 120 supplies a drive control signal to the zoom lens driver 113 to drive the zoom lens 112 in response to the operation on the operation ring 115. Similarly, when the diaphragm 116 is assigned to the operation ring 115 as the operable member, the lens controller 120 supplies a drive control signal to the diaphragm driver 117 to drive the diaphragm 116 in response to the operation on the operation ring 115.

1-3. Configuration of Camera Body

The configuration of the camera body 102 will be described.

The camera body 102 has the camera controller 153, a body mount 140, a CMOS image sensor 150, a timing generator (hereinafter, referred to as the 'TG') 151, an analog front end (hereinafter, referred to as the 'ARE') 152, a liquid crystal display monitor 163, a touch panel 162, a release button 160, a camera side operation unit 170, an power supply 154, a DRAM 155, a flash memory 156, a card slot 165, and a memory card 164.

The camera controller 153 controls each of the components of the digital camera 100 including the CMOS image sensor 150 based on an instruction from the release button 160 or the camera side operation unit 170. The camera controller 153 sends a vertical synchronizing signal to the timing generator 151 (TG 151). In parallel with that, the camera controller 153 generates an exposure synchronizing signal based on the vertical synchronizing signal, and periodically sends the generated exposure synchronizing signal to the lens controller 120 through the body mount 140 and the lens mount 130. The camera controller 153 is connected to the DRAM 155 and the flash memory 156. The camera controller 153 can write/read information to/from the DRAM 155 and the flash memory 156 as required. The camera controller 153 may be composed of a hardwired electronic circuit, a microcomputer using a program, or the like.

The DRAM 155 is used as a work memory by the camera controller 153 for the respective types of control. The flash memory 156 stores a program, parameters and the like used by the camera controller 153 in the respective types of control.

The CMOS image sensor 150 captures a subject image incident through the electromotive interchangeable lens 101 and generates image information. The generated image information is converted from analog data to digital data in the AFE 152. The image information converted to digital data in the AFE 152 is subjected to respective types of image processing in the camera controller 153. For example, the various types of image processing here includes, but not limited to, gamma correction process and/or white balance correction process, flaw correction process, YC conversion process, electronic zoom process, and JPEG compression process. In the embodiment, another imaging device such as an NMOS image sensor or a CCD image sensor may be used in place of the CMOS image sensor 150.

The CMOS image sensor 150 operates at the timing decided by the TG 151. The operation of the CMOS image sensor 150 under control of the TG 151 includes capture operation of a still image and a through image, data transfer operation, and electronic shutter operation. The through image, primarily a moving image, is displayed on the liquid crystal display monitor 163 for the user to decide the composition of the still image. Such through image can be displayed as a real-time image.

The liquid crystal display monitor 163 is placed on the backside of the camera body 102 and displays the image represented by the display image information processed by the camera controller 153. The liquid crystal display monitor 163 can selectively display both the moving image and the still image. Besides, the liquid crystal display monitor 163 can display the whole setting conditions and the like of the digital camera 100 in addition to the moving image. In this embodiment, although the liquid crystal display monitor 163 is described as an example of display means, the display means is not limited thereto. For example, an organic electroluminescence (EL) display or any other type of display may be used as the display means.

The touch panel 162 is provided on the surface of the liquid crystal display monitor 163 and generates information on the electrode location on the touch panel where the user touches. The touch panel 162 calculates the position coordinate on the touch panel where the user touches based on the information on the electrode location and sends it to the camera controller 153.

The body mount 140 is a connection member for mechanically and electrically connecting the electromotive interchangeable lens 101 and the camera body 102 in cooperation with the lens mount 130 of the electromotive interchangeable lens 101. When the electromotive interchangeable lens 101 and the camera body 102 are mechanically and electrically connected, the lens controller 120 and the camera controller 153 can communicate with each other. The body mount 140 sends the exposure synchronizing signal and other control signals received from the camera controller 153 to the lens controller 120 through the lens mount 130. Also, the body mount 140 sends the signal received from the lens controller 120 to the camera controller 153 through the lens mount 130.

The power supply 154 supplies power to the digital camera 100 for operation. The power supply 154 may be a dry battery or a rechargeable battery. The digital camera 100 may also be adapted to be powered from outside through a power cord. When a power button (not shown) of the camera body 102 is turned to the state indicative of ON state, the camera controller 153 controls the power supply 154 to supply power to the entire camera body 102. The camera controller 153 supplies power to the electromotive interchangeable lens 101 through the body mount 140 and the lens mount 130. Then, the lens controller 120 supplies power supplied from the camera body 102 to respective components of the electromotive interchangeable lens 101.

The card slot 165 is a connection means capable of electrically and mechanically attaching/detaching the memory card 164 to/from the camera body 102. The card slot 165 may have a function of controlling the memory card 164.

The memory card 164 is an external memory containing a storage cell such as a flash memory. The memory card 164 can store data including image information processed by the camera controller 153. The memory card 164 can also output the data including the image information stored therein. The image information outputted from the memory card 164 is processed by the camera controller 153 and displayed, for example, on the liquid crystal display monitor 163. The action of displaying the image information stored in the memory card 164 on the liquid crystal display monitor 163 or the like is called 'reproduction and display'.

The release button 160 receives user's operation. The two-stage operation of the half-press stage and the full-press stage is available for the release button 160. In response to the user's half-press operation on the release button 160, the camera controller 153 performs the autofocus operation. When the user subsequently full-presses the release button 160, the camera controller 153 records the image information generated just at the moment of the full-press operation to the memory card 164.

The camera side operation unit 170 collectively refers to the operation members including the above described center button 204 and directional buttons 205. The camera side operation unit 170 also includes an MF/AF switch for switching between MF mode and the AF mode of the digital camera 100. When the camera side operation unit 170 receives user's operation, the camera controller 153 performs respective types of control based on instruction provided by user's operation.

1-4. Types of Camera Body

The camera body 102 which controls the electromotive interchangeable lens 101 of the embodiment can be classified into four types based on the operating function of the electromotive interchangeable lens 101 (the manual zoom, the manual focus), which the camera body 102 can control.

Classification by the function supported by the camera body 102 will be described with reference to FIG. 4. The camera body 102 is classified into four types of camera body shown below according to whether or not it supports the manual zoom control and the manual focus control for the electromotive interchangeable lens 101. The four types of camera body 102 described below are the same in the electrical configuration having been described with reference to FIG. 3, and are only different from one another in whether they support the above described controls or not.

As shown in FIG. 4A, the first type is the type of camera body which can support both the manual zoom control and the manual focus control. This type of camera body 102 assigns the manual zoom function and the manual focus function to the camera side operation unit 170 so that the manual zoom control and the manual focus control can be performed on the attached electromotive interchangeable lens 101 in response to the operation on the camera side operation unit 170. Hereinafter, this type of camera body will be referred to as the 'MZ and MF supporting camera body'.

As shown in FIG. 4B, the second type is the type of camera body which can support only the manual zoom control. This type of camera body 102 assigns the manual zoom function to the camera side operation unit 170 so that the manual zoom control can be performed on the attached electromotive interchangeable lens 101 in response to the operation on the camera side operation unit 170. Hereinafter, this type of camera body will be referred to as the 'MZ supporting camera body'.

As shown in FIG. 4C, the third type is the camera body 102 which can support only the manual focus control. This type of camera body 102 assigns the manual focus function to the camera side operation unit 170 so that the manual focus control can be performed on the attached electromotive interchangeable lens 101 in response to the operation on the camera side operation unit 170. Hereinafter, this type of camera body will be referred to as the supporting camera body'.

As shown in FIG. 4D, the fourth type is the camera body 102 which supports neither the manual zoom control nor the manual focus control. This type of camera body 102 cannot assign the manual zoom operating function and the manual focus operating function for the electromotive interchangeable lens 101 to the camera side operation unit 170. Therefore, this type of camera body 102 cannot perform the manual zoom control and the manual focus control on the attached electromotive interchangeable lens 101 in response to the operation on the camera side operation unit 170. Hereinafter, this type of camera body will be referred to as the 'MZ and MF non-supporting camera body'.

2. Operation
2-1. Outline of Operation

The operations of the digital camera 100 of the embodiment will be outlined. When the power supply for the camera body 102 with the electromotive interchangeable lens 101 attached thereto is switched on, various types of initial settings are performed as well as supplying of power. Then, the electromotive interchangeable lens 101 attached to the camera body 102 decides assignment of the operating function to the operation ring 115 according to the information obtained from the camera body 102. Specifically, it decides whether the focus lens or the zoom lens is to be assigned to the operation ring 115 as the operable member.

The operation of assigning the operating function to the operation ring 115 differs depending on the type of attached camera body 102. That is, the operation of assigning the operating function to the operation ring 115 of the electromotive interchangeable lens 101 depends on which of the MZ and MF supporting camera body, the MZ supporting camera body, the MF supporting camera body, and the MZ and MF non-supporting camera body has the electromotive interchangeable lens 101 attached thereto. The operation of assigning the operating function to the operation ring 115 differs for the MF mode and the AF mode.

The operation in each of cases including a case where the electromotive interchangeable lens 101 is attached to the MZ and MF supporting camera body, a case where the electromotive interchangeable lens 101 is attached to the MZ supporting camera body, a case where the electromotive interchangeable lens 101 is attached to the MF supporting camera body, and a case where the electromotive interchangeable lens 101 is attached to the MZ and MF non-supporting camera body will be described in detail below.

2-2. Case of MZ and MF Supporting Camera Body
2-2-1. Initial Operation

The operation in the case where the electromotive interchangeable lens 101 is attached to the MZ and MF supporting camera body 102 will be described.

Figure 5:
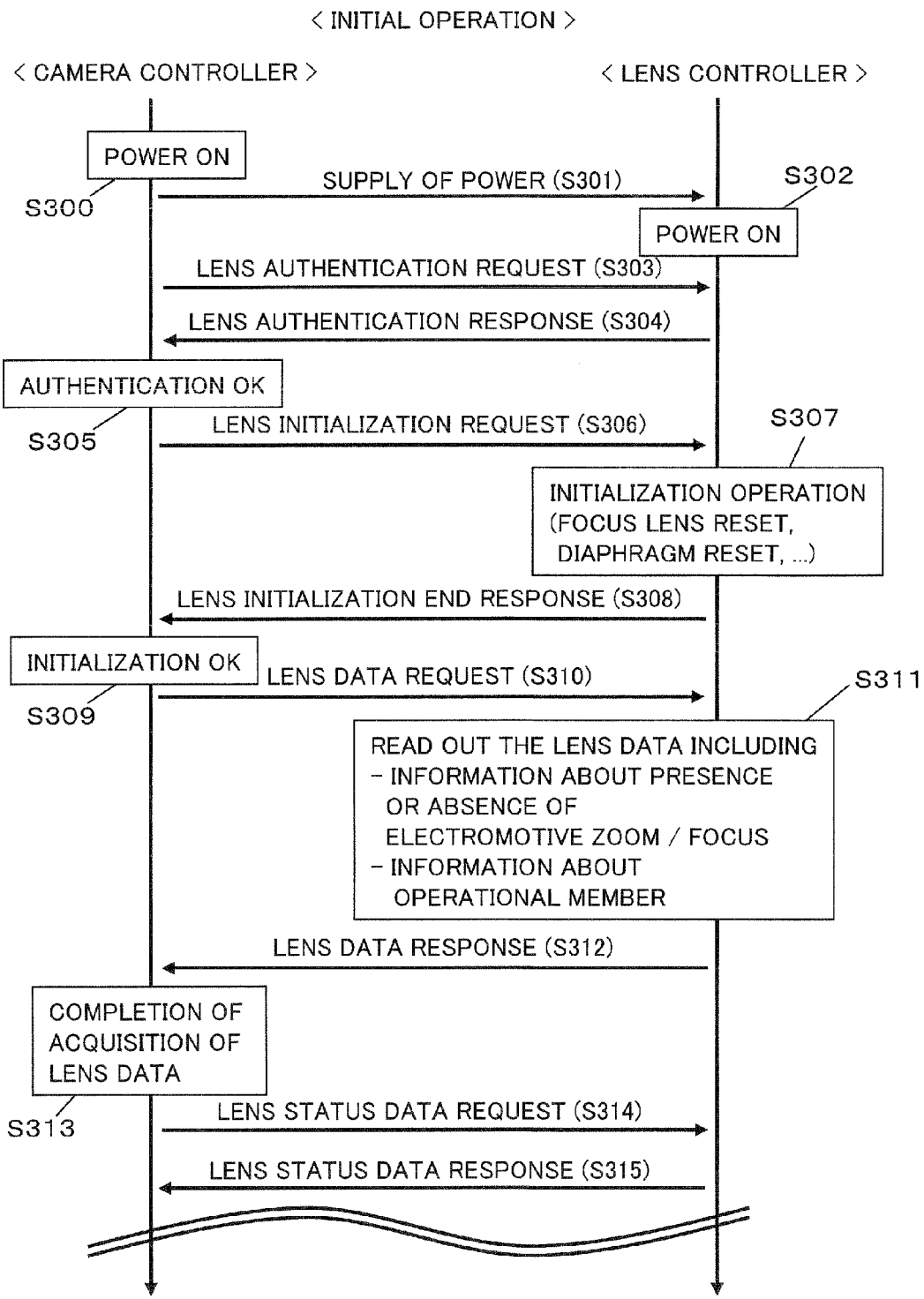
FIG. 5 is a flow chart of an initial operation of the digital camera.

First, the initial operation of the camera body 102 to which the electromotive interchangeable lens 101 is attached will be described with reference to FIG. 5.

When the user switches on the power supply 154 of the MZ and MF supporting camera body 102 with the electromotive interchangeable lens 101 attached thereto (S300), the power supply 154 supplies power to the electromotive interchangeable lens 101 through the body mount 140 and the lens mount 130 (S301). As a result, power is supplied to each component of the electromotive interchangeable lens 101 (S302).

The camera controller 153 requests authentication information of the electromotive interchangeable lens 101 from the lens controller 120 (S303). The authentication information of the electromotive interchangeable lens 101 includes information on whether or not the electromotive interchangeable lens 101 is attached and information whether or not an accessory is attached to the electromotive interchangeable lens 101. The lens controller 120 responds to the lens authentication request from the camera controller 153 by sending the authentication information to the camera controller 153 (S304). With the response from the lens controller 120, the camera controller 153 can complete the lens authentication and recognize whether or not the electromotive interchangeable lens 101 is attached to the MZ and MF supporting camera body 102 and whether or not the accessory such as a teleconverter lens and a wide-converter lens are attached (S305).

Next, the camera controller 153 requests the lens controller 120 to perform the initialization operation (S306). In response to the request of the initialization operation, the lens controller 120 performs the initialization operation such as reset of the focus lens 110, reset of the zoom lens 112, and reset of the diaphragm 116 (S307). Then, the lens controller 120 responds to the camera controller 153 by sending information indicating the completion of the lens initialization operation thereto (S308). As a result, the camera controller 153 can recognize that the lens has been initialized (S309).

Next, the camera controller 153 requests lens data from the lens controller 120 (S310). The lens data is stored in the flash memory 122 of the electromotive interchangeable lens 101. Since the camera body 102 supports both the manual zoom control and the manual focus control here, the camera controller 153 sends to the lens controller 120 information indicating that both the manual zoom and the manual focus are supported. With the information on support/non-support received, the lens controller 120 can recognize that the camera body 102 to which the lens is attached is the MZ and MF supporting camera body. The lens controller 120 reads the lens data out from the flash memory 122 according to the lens data request from the camera controller 153 (S311). Then, the lens controller 120 responds to the camera controller 153 by sending the read out lens data thereto (S312).

Here, the lens data is a characteristic value specific to the electromotive interchangeable lens 101, such as a lens name, F-number, a zoom control range, a focus control range, information on the operation member, and information on support/non-support of the electric zoom/focus function. With the information on the support/non-support of the electric zoom/focus function obtained, the camera controller 153 can recognize support/non-support of the electric zoom/focus function of the interchangeable lens attached to the camera body 102. Based on the information on support/non-support of the electric zoom/focus function, the camera controller 153 can perform respective types of control on the electric zoom/focus of the interchangeable lens 101, if the camera body 102 supports the function.

The information on the operation member included in the lens data includes the type of the operation member (the shape of the ring, the shape of the lever, the shape of the switch) and the number of the operation members. With the information on the operation member obtained, the camera controller 153 can recognize the operation member of the interchangeable lens attached to the camera body 102. According to the information on the operation member, the camera controller 153 can perform the control suitable for the operation member of the attached interchangeable lens, if the camera body 102 supports the control of the operation member.

For example, the camera controller 153 can assign the operating function (manual zoom or manual focus) for the interchangeable lens to the camera side operation unit 170 based on the type of the attached interchangeable lens. Similarly, the camera controller 153 can assign the operating function for the interchangeable lens to the camera side operation unit 170 based on the number of the operation member of the attached interchangeable lens.

As a result of the above described operations, the camera controller 153 completes obtaining the lens data of the attached electromotive interchangeable lens 101 (S313).

When the camera controller 153 obtains the lens data of the electromotive interchangeable lens 101, the digital camera 100 is enabled to capture an image. Hereafter, the camera controller 153 periodically requests lens status data indicative of the state of the electromotive interchangeable lens 101 from the lens controller 120 (S314). The lens status data includes, for example, zoom magnification information of the zoom lens 112, positional information of the focus lens 110, aperture value information of the diaphragm 116. In response to the request, the lens controller 120 sends the requested lens status data to the camera controller 153 (S315).

As described above, the MZ and MF supporting camera body 102 and the electromotive interchangeable lens 101 request data required by the MZ and MF supporting camera body 102 and the electromotive interchangeable lens 101, respond to the request to send the required data, and then complete the initial setting operation.

2-2-2. First Operation in MF Mode

The operation (action) of the MZ and MF supporting camera body 102 in the MF mode will be described. The operation (action) of the MZ and MF supporting camera body 102 in the MF mode includes two operations of a first operation and a second operation. The first operation is an operation of assigning the manual focus operating function to the operation ring 115 when the digital camera 100 is set to the MF mode. The second operation is an operation of assigning the manual focus operating function to the camera side operation unit 170. Which of the first operation and the second operation is preferable to the user depends on the actual shape of the digital camera 100 and the user's way of shooting the image. The user can previously select and set whether the MZ and MF supporting camera body 102 performs the first operation or the second operation in the MF mode.

Figure 6:
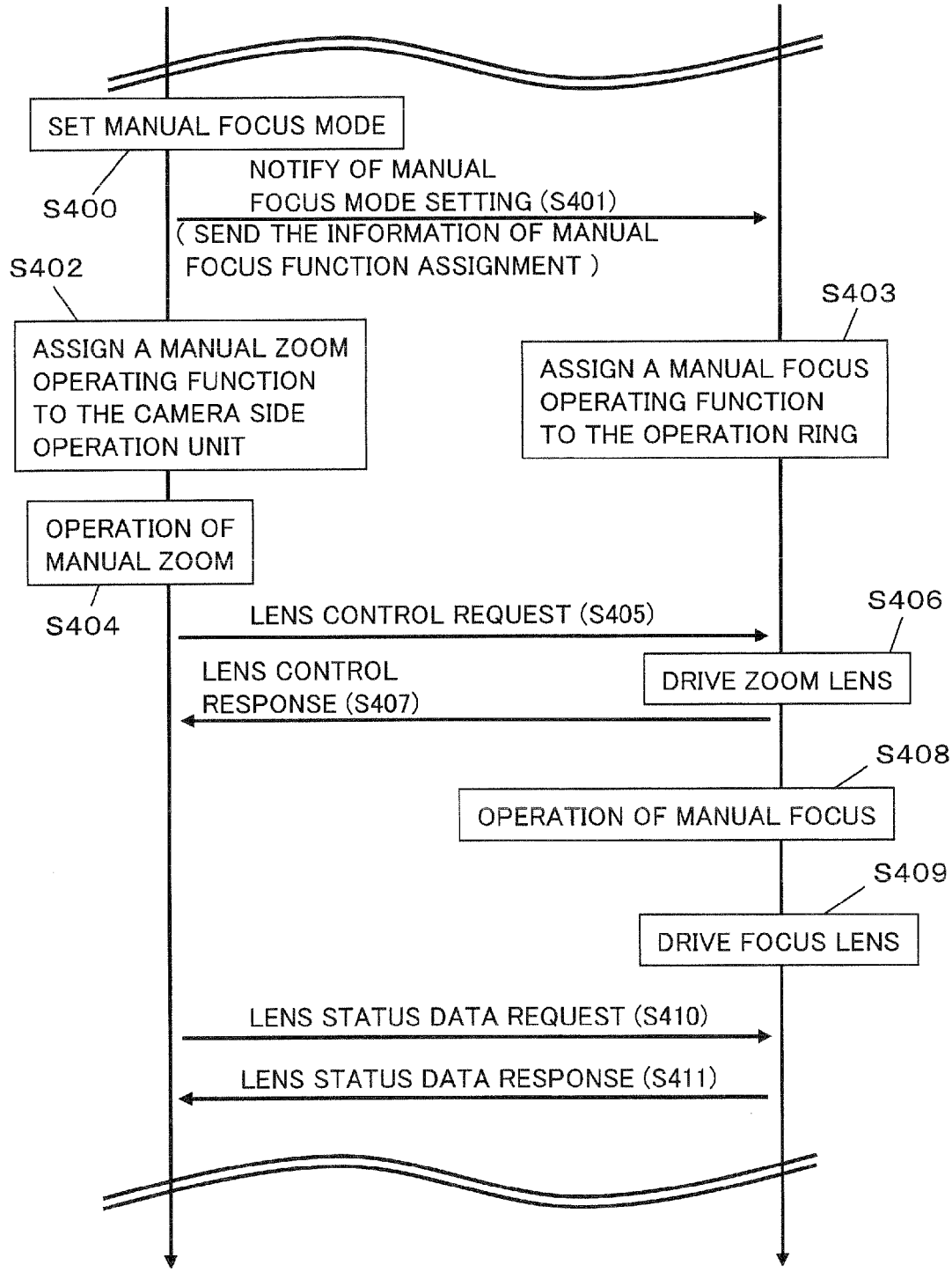
FIG. 6 is a first operational flow chart of an MZ and MF supporting camera body in MF mode.

First, the first operation of the MZ and MF supporting camera body 102 in the MF mode will be described with reference to FIG. 6. Since the first operation is previously selected and set as the action in the MF mode, when the manual focus is selected by the operation on the MF/AF switch, the camera controller 153 sets the operation mode of the camera body 102 to the MF mode (S400). Then, the camera controller 153 sends to the lens controller 120 the information on the MF mode setting (S401). With the information on the MF mode setting received, the lens controller 120 can set the operation mode of the electromotive interchangeable lens 101 to the MF mode.

Subsequently, the camera controller 153 assigns the manual zoom operating function to the camera side operation unit 170 (S402). Consequently, when the camera side operation unit 170 is operated by the user (S404), the lens control request is sent to the lens controller 120 according to the operation information (S405). The lens controller 120 sends a drive control signal to the zoom lens driver 113 to drive the zoom lens 112 according to the received operation information (S406). That is, when the manual zoom operating function is assigned to the camera side operation unit 170, the zoom lens 112 is driven in response to the operation on the camera side operation unit 170. After the zoom lens 112 is driven, the lens controller 120 sends to the camera controller 153 the lens control response indicating the response to the lens control request (S407).

On the other hand, the lens controller 120 assigns the manual focus operating function to the operation ring 115 according to the received information on the MF mode setting (S403). In that case, when sending the MF mode setting to the lens controller 120, the lens controller 120 may receive from the camera controller 153 the information indicating that the manual focus operating function is to be assigned to the operation ring 115 together with the received information on the MF mode setting. Further, the lens controller 120 may assign the manual focus operating function to the operation ring 115 according to the information. Alternatively, the lens controller 120 may determine by itself that the lens controller 120 should assign the manual focus operating function to the operation ring 115 based on the information on the MF mode setting sent from the camera controller 153.

Since the manual focus operating function is assigned to the operation ring 115, when the operation ring 115 is operated by the user (S408), the operation information is sent to the lens controller 120. The lens controller 120 sends a drive control signal to the focus lens driver 111 to drive the focus lens 110 according to the received operation information (S409). That is, when the manual focus operating function is assigned to the operation ring 115, the focus lens 110 is driven in response to the operation on the operation ring 115.

After the assignment of the operating functions to the respective operation units 115 and 170, the camera controller 153 periodically requests the lens status data indicative of the state of the electromotive interchangeable lens 101 from the lens controller 120 (S410). In response to the request, the lens controller 120 sends the requested lens status data to the camera controller 153 (S411).

As described above, in the first operation of the MZ and MF supporting camera body 102 in the MF mode, the digital camera 100 assigns the manual focus operating function to the operation ring 115 of the electromotive interchangeable lens 101 and the manual zoom operating function to the camera side operation unit 170. Therefore, in the first operation, the user can determine a composition by one hand.

Alternatively, the digital camera 100 may be adapted to display a GUI for manual zoom operation on the liquid crystal display monitor 163 to receive user's direct indication of the zoom position by touch operation on the touch panel 162.

2-2-3. Second Operation in MF Mode

Figure 7:
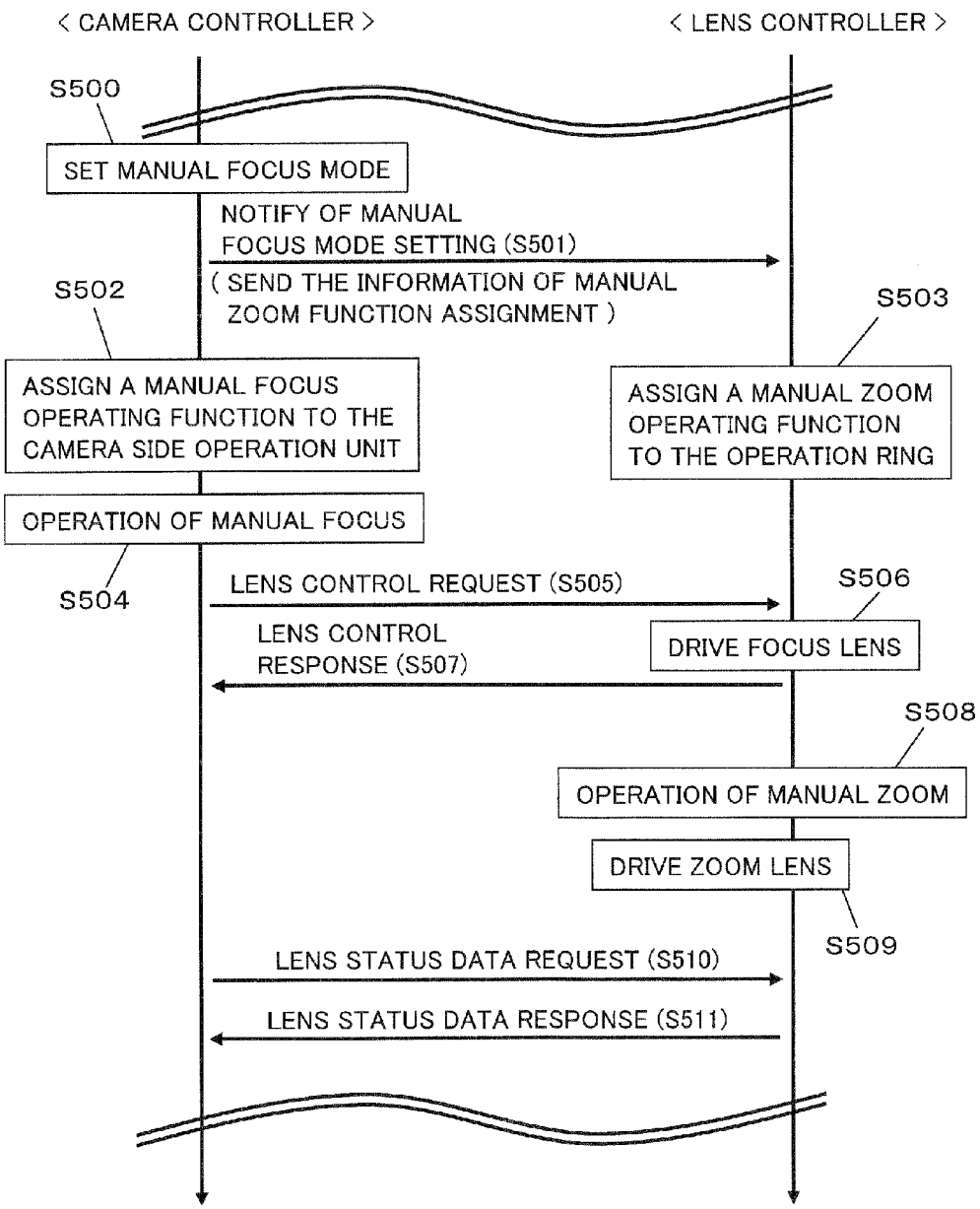
FIG. 7 is a second operational flow chart of the MZ and MF supporting camera body in MF mode.

Now, the second operation of the MZ and MF supporting camera body 102 in the MF mode will be described with reference to FIG. 7. The second operation is an action having assignment of the manual focus and the manual zoom reversed to that of the first operation.

When the second operation is previously selected and set as the action in the MF mode and the manual focus is selected by the operation on the MF/AF switch, the camera controller 153 sets the operation mode of the camera body 102 to the MF mode (S500). Then, the camera controller 153 sends to the lens controller 120 the information on the MF mode setting (S501). With the information on the MF mode setting received, the lens controller 120 sets the operation mode of the electromotive interchangeable lens 101 to the MF mode.

Subsequently, the camera controller 153 assigns the manual focus operating function to the camera side operation unit 170 (S502). Consequently, when the camera side operation unit 170 is operated by the user after that (S504), the lens control request is sent to the lens controller 120 according to the operation information (S505). The lens controller 120 sends a drive control signal to the focus lens driver 111 to drive the focus lens 110 according to the received operation information (S506). That is, when the manual focus operating function is assigned to the camera side operation unit 170, the focus lens 110 is driven in response to the operation on the camera side operation unit 170. After driving the focus lens 110, the lens controller 120 sends to the camera controller 153 the lens control response indicating the response to the lens control request (S507).

On the other hand, the lens controller 120 assigns the manual zoom operating function to the operation ring 115 according to the information on the MF mode setting (S503). In that case, when sending the MF mode setting to the lens controller 120, the lens controller 120 may receive from the camera controller 153 the information indicating that the manual zoom operating function is to be assigned to the operation ring 115 together with the information on the MF mode setting, and assign the manual zoom operating function to the operation ring 115 according to the information. Alternatively, the lens controller 120 may determine by itself that the lens controller 120 should assign the manual zoom operating function to the operation ring 115 based on the information on the MF mode setting sent from the camera controller 153.

With the manual zoom operating function assigned to the operation ring 115, when the operation ring 115 is operated by the user (S508), the operation information is sent to the lens controller 120. The lens controller 120 sends a drive control signal to the zoom lens driver 113 to drive the zoom lens 112 according to the received operation information (S509). That is, when the manual zoom operating function is assigned to the operation ring 115, the zoom lens 112 is driven in response to the operation on the operation ring 115.

Also after the completion of the second operation, similarly to that after the completion of the first operation, the camera controller 153 periodically requests the lens status data indicative of the state of the electromotive interchangeable lens 101 from the lens controller 120 (S510). In response to the request, the lens controller 120 sends the requested lens status data to the camera controller 153 (S511).

As described above, in the second operation of the MZ and MF supporting camera body 102 in the MF mode, the manual focus operating function is assigned to the camera side operation unit 170 and the manual zoom operating function is assigned to the operation ring 115 on the electromotive interchangeable lens 101 side. That is, the user can manually set the focus on the camera side operation unit 170. Adjusting the focus with the operation member on the interchangeable lens is likely to cause camera shake due to the operation of the operation ring 115. On the other hand, in the second operation, the focus is adjusted with the operation member on the camera side. Therefore, the camera shake can be reduced more, especially in a case of macrophotography than in a case where the focus is adjusted with the operation member on the interchangeable lens side.

Similarly to the first operation, the digital camera 100 may be adapted to display a GUI for manual focus operation on the liquid crystal display monitor 163 to receive user's direct indication of the focus position by the touch operation on the touch panel 162.

2-2-4. Operation in AF Mode

Figure 8:
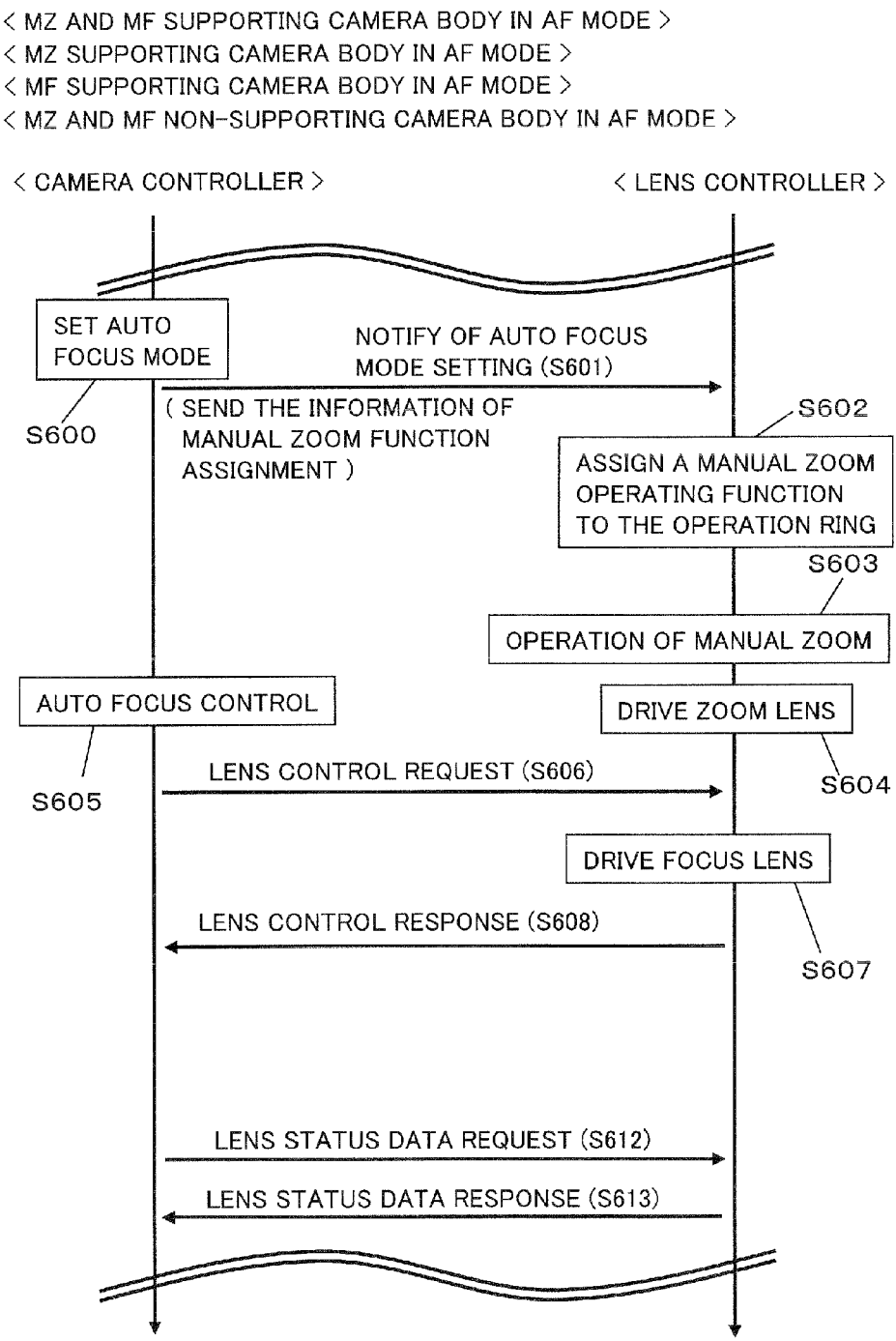
FIG. 8 is an operational flow chart of the MZ and MF supporting camera body in AF mode.

The operation of the MZ and MF supporting camera body 102 in the AF mode will be described with reference to FIG. 8.

When the autofocus is selected by the operation on the MF/AF switch, the camera controller 153 sets the operation mode of the camera body 102 to the AF mode (S600). Then, the camera controller 153 sends to the lens controller 120 the information on the AF mode setting (S601). With the information on the AF mode setting, the lens controller 120 can set the operation mode of the electromotive interchangeable lens 101 to the AF mode.

When the lens controller 120 receives the information on the AF mode setting, it assigns the manual zoom operating function to the operation ring 115 (S602). In that case, when sending the information on the AF mode setting to the lens controller 120, the lens controller 120 may receive from the camera controller 153 the information indicating that the manual zoom operating function is to be assigned to the operation ring 115 together with the information on the AF mode setting, and assign the manual zoom operating function to the operation ring 115. Alternatively, the lens controller 120 may determine by itself that it should assign the manual zoom operating function to the operation ring 115 based on the information on the AF mode setting from the camera controller 153.

The reason for assigning the manual zoom operating function to the operation ring 115 is that the manual focus operating function by the operation ring 115 of the electromotive interchangeable lens 101 is not needed in the AF mode. When the operation ring 115 is operated by the user (S603), the operation information is sent to the lens controller 120. The lens controller 120 sends a drive control signal to the zoom lens driver 113 to drive the zoom lens 112 according to the received operation information (S604). That is, when the manual zoom operating function is assigned to the operation ring 115, the zoom lens 112 is driven in response to the operation on the operation ring 115.

Here, in the AF mode, the operating function assigned by the camera controller 153 to the camera side operation unit 170 may be the manual focus operating function or the manual zoom operating function. However, since the focus is automatically set in the AF mode, it is preferable to assign the manual zoom operating function to the camera side operation unit 170. This allows the user to easily shoot a picture by one hand. Although the manual zoom operating function is assigned to both the camera side operation unit 170 and the operation ring 115 here, it may be adapted to prioritize the operation performed by the camera side operation unit 170 and the operation performed by the operation ring 115 to prevent the conflict between the operation controls.

In response to the half-press operation on the release button 160, the camera controller 153 performs the autofocus control (S605). The autofocus mode adopted by the camera controller 153 may be the contrast autofocus system or the phase-difference autofocus sysytem. The camera controller 153 sends the lens control request to the lens controller 120 to make the lens focus on the subject in the autofocus system which is set (S606). The lens controller 120 sends a drive control signal to the focus lens driver 111 to drive the focus lens 110 according to the received lens control request. That is, when the release button 160 is half-pressed, the focus lens 110 is driven (S607). After driving the focus lens 110, the lens controller 120 sends to the camera controller 153 the lens control response indicating the response to the lens control request (S608).

Thereafter, the camera controller 153 periodically requests the lens status data indicative of the state of the electromotive interchangeable lens 101 from the lens controller 120 (S612). In response to the request, the lens controller 120 sends the requested lens status data to the camera controller 153 (S613).

As described above, in the AF mode, the camera body 102 of the embodiment assigns the manual zoom operating function to the operation ring 115 on the electromotive interchangeable lens 101 side which is easier for the user to operate than the camera side operation unit 170. This improves the convenience of the digital camera 100.

2-2-5. Operation in AF+MF Mode

The digital camera 100 of the embodiment supports the AF+MF mode in addition to the MF mode and the AF mode. The 'AF+MF mode' allows the user to manually fine-tune the camera's focus state on the subject after the completion of the autofocus control operation by the camera controller 153.

The operation of the MZ and MF supporting camera body 102 in the AF+MF mode will be described with reference to FIG. 9. The user can previously set the option on whether the MZ and MF supporting camera body 102 operates in the AF mode or the AF+MF mode.

Figure 9:
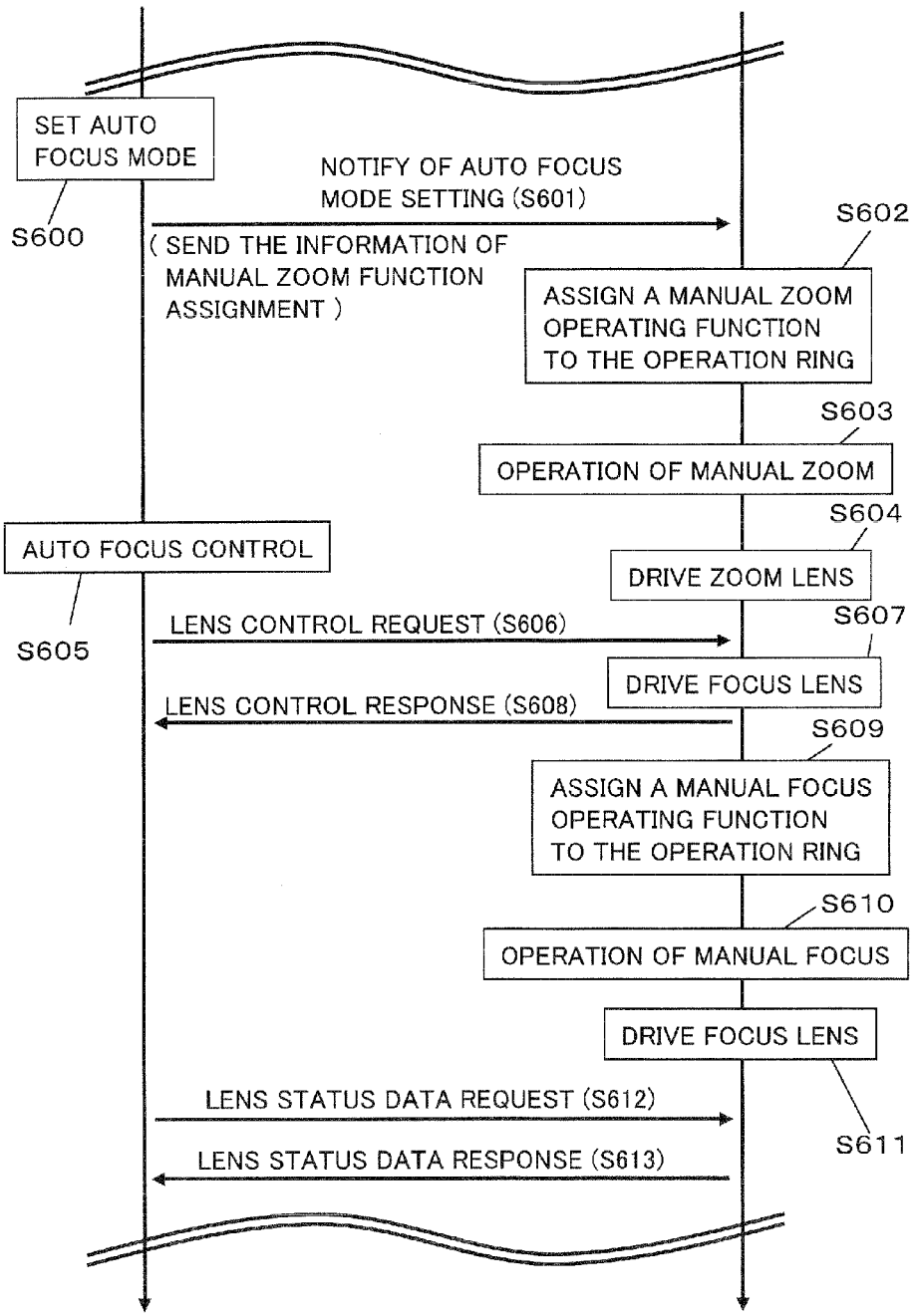
FIG. 9 is an operational flow chart of the MZ and MF supporting camera body in AF+MF mode.

When the autofocus is selected by the operation on the MF/AF switch, the MZ and MF supporting camera body 102 first performs the AF mode operation (S600 to S608 in FIG. 9). Since this series of operations are the same as the AF mode operations shown in FIGS. 8 (S600 to S608 in FIG. 8), the description thereto is omitted here.

When the AF+MF mode is set, the camera controller 153 sets the operation mode of the MZ and MF supporting camera body 102 to the AF+MF mode after the completion of the autofocus control operation.

Here, although not shown in the figure, the camera controller 153 sends the information on the AF+MF mode setting to the lens controller 120. With this information, the lens controller 120 can set the operation mode of the electromotive interchangeable lens 101 to the AF+MF mode. In that case, when sending the information on the AF+MF mode setting to the lens controller 120, the lens controller 120 may receive from the camera controller 153 the information indicating that the manual focus operating function is to be assigned to the operation ring 115 together with the information on the AF+MF mode setting, and assign the manual focus operating function to the operation ring 115. Alternatively, the lens controller 120 may determine by itself that it should assign the manual focus operating function to the operation ring 115 based on the information on the AF+MF mode setting from the camera controller 153.

When the lens controller 120 receives the information on the AF+MF mode setting, it assigns the manual focus operating function to the operation ring 115 (S609). Thereafter, when the operation ring 115 is operated by the user (S610), the operation information is sent to the lens controller 120. The lens controller 120 sends a drive control signal to the focus lens driver 111 to drive the focus lens 110 according to the received operation information (S611). That is, when the manual focus operating function is assigned to the operation ring 115, the focus lens 110 is driven in response to the operation on the operation ring 115.

As described above, in the operation of the MZ and MF supporting camera body 102 in the AF+MF mode, the manual zoom operating function is assigned to the operation ring 115 on the electromotive interchangeable lens 101 side at first. Then, after the completion of the autofocus operation, the manual focus operating function is assigned to the operation ring 115 on the electromotive interchangeable lens 101 side. Accordingly, the user can consistently perform the manual zoom setting and the manual focus setting by only operating the operation ring 115.

2-3. Case of MZ Supporting Camera Body

The operation in the case where the electromotive interchangeable lens 101 is attached to the MZ supporting camera body 102 will be described. Since the initial operation of the camera body 102 with the attached electromotive interchangeable lens 101 is the same as that of the MZ and MF supporting camera body 102 described with reference to FIG. 5, the description is omitted.

The operation of the MZ supporting camera body 102 in the MF mode is the same as the first operation of the MZ and MF supporting camera body 102 described with reference to FIG. 6. The operations of the MZ supporting camera body 102 in the AF mode and the AF+MF mode are the same as those of the MZ and MF supporting camera body 102 in the AF mode and the AF+MF mode described with reference to FIG. 8. However the body type is the MZ supporting camera body, the operating function to be assigned to the camera side operation unit 170 is the manual zoom operating function.

As described above, when the electromotive interchangeable lens 101 is attached to the MZ supporting camera body 102, the user can perform zoom operation by one hand as in the case where the first operation is performed when the electromotive interchangeable lens 101 is attached to the MZ and MF supporting camera body 102.

2-4. Case of MF Supporting Camera Body

The operation in the case where the electromotive interchangeable lens 101 is attached to the MF supporting camera body 102 will be described. Since the initial operation of the camera body 102 with the attached electromotive interchangeable lens 101 is the same as that of the MZ and MF supporting camera body 102 described with reference to FIG. 5, the description thereto is omitted from the description. Since it is the MF supporting camera body 102, however, it is needless to say that the camera controller 153 sends to the lens controller 120 information indicating that the camera body 102 is the MF supporting camera body in step S310 of FIG. 5.

The operation of the MF supporting camera body 102 in the MF mode is the same as the second operation of the MZ and MF supporting camera body 102 described with reference to FIG. 7. The operations of the MF supporting camera body 102 in the AF mode and in the AF+MF mode are the same as those of the MZ and MF supporting camera body 102 in the AF mode and the AF+MF mode described with reference to FIG. 8. However the camera body type is the MF supporting camera body, the operating function to be assigned to the camera side operation unit 170 is the manual focus operating function. Since the manual focus operation is not needed in the AF mode, the manual focus operating function assigned to the camera side operation unit 170 may be inactivated.

As described above, when the electromotive interchangeable lens 101 is attached to the MF supporting camera body 102, the manual focus operating function is assigned to the camera side operation unit 170 as in the case when the second operation is performed when the electromotive interchangeable lens 101 is attached to the MZ and MF supporting camera body 102. Accordingly, the camera shake can be reduced more effectively in the case of macrophotography than the case where the user sets the focus on the operation member on the interchangeable lens side.

2-5. Case of MZ and MF Non-Supporting Camera Body 2-5-1. Initial Operation

The operation in the case where the electromotive interchangeable lens 101 is attached to the MZ and MF non-supporting camera body 102 will be described. Since the initial operation of the camera body 102 with the electromotive interchangeable lens 101 attached thereto is the same as that of the MZ and MF supporting camera body 102 described with reference to FIG. 5, the explanation thereto is omitted.

2-5-2. Operation in MF Mode

Figure 10:
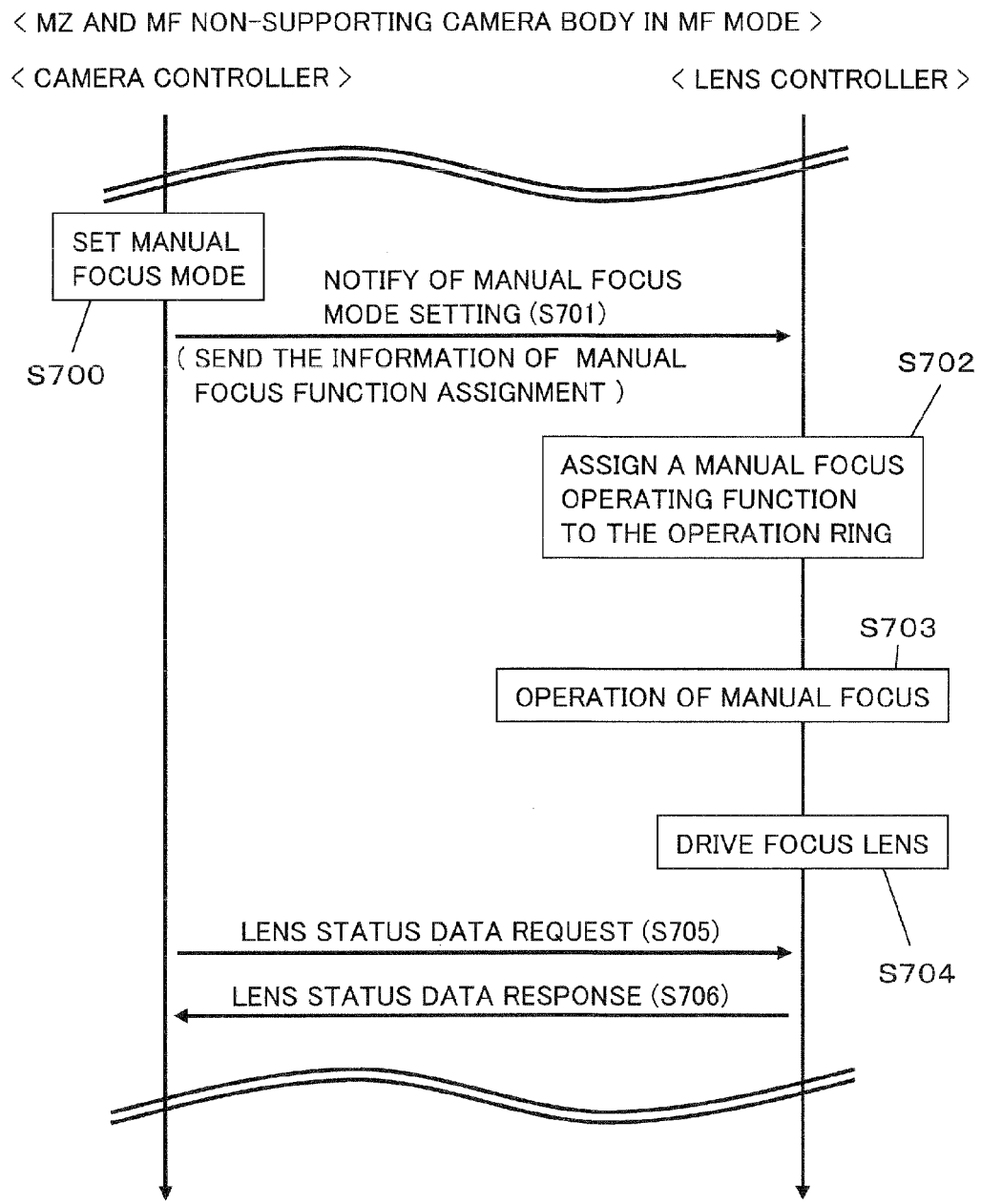
FIG. 10 is an operational flow chart of the MZ and MF non-supporting camera body in MF mode.

The operation of the MZ and MF non-supporting camera body 102 in the MF mode will be described with reference to FIG. 10. When the MF mode is selected by the operation on the MF/AF switch, the camera controller 153 sets the operation mode of the camera body 102 to the MF mode (S700). Then, the camera controller 153 sends to the lens controller 120 the information on the MF mode setting (S701). With this information, the lens controller 120 can set the operation mode of the electromotive interchangeable lens 101 to the MF mode.

The lens controller 120 assigns the manual focus operating function to the operation ring 115 according to the information on the MF mode setting (S702). Here, the lens controller 120 determines by itself that it should assign the manual focus operating function to the operation ring 115 based on the information on the MF mode setting from the camera controller 153. Since the manual focus operating function is assigned to the operation ring 115, when the user operates the operation ring 115 (S703), the operation information is sent to the lens controller 120. The lens controller 120 sends a drive control signal to the focus lens driver 111 to drive the focus lens 110 according to the received operation information (S704). That is, when the manual focus operating function is assigned to the operation ring 115, the focus lens 110 is driven in response to the operation on the operation ring 115. On the other hand, since the camera body type is the MZ and MF non-supporting camera body, the camera controller 153 does not assign the operating function to the camera side operation unit 170. Therefore, the manual zoom control is not available by operating the camera side operation unit 170.

Even in the MF mode operation of the MZ and MF non-supporting camera body 102, the camera controller 153 periodically requests the lens status data indicative of the state of the electromotive interchangeable lens 101 from the lens controller 120 (S705). In response to the request, the lens controller 120 sends the requested lens status data to the camera controller 153 (S706).

2-5-3. Operation in AF Mode

Next, the operation of the MZ and MF non-supporting camera body 102 in the AF mode will be described. The operations of the MZ and MF non-supporting camera body 102 in the AF mode and the AF+MF mode are the same as those of the MZ and MF supporting camera body 102 in the AF mode and the AF+MF mode described with reference to FIG. 8. However, since the camera body type is the MZ and MF non-supporting camera body, the camera controller 153 does not assign the operating function to the camera side operation unit 170. That is, the manual zoom control operation and the manual focus control operation are not available by operating the camera side operation unit 170.

As described above, according to the embodiment, when the electromotive interchangeable lens 101 is attached to the MZ and MF non-supporting camera body 102, the preferable operating function can be assigned to the operation ring 115 of the electromotive interchangeable lens 101 according to the focus mode. Therefore, the embodiment can provide the electromotive interchangeable lens 101 which is highly convenient to the user.

3. Summary

The electromotive interchangeable lens 101 of the embodiments is an electromotive interchangeable lens attachable to the camera body 102, and includes the focus lens 110, the zoom lens 112, the operation ring 115 for receiving user's operation for the focus lens 110 or the zoom lens 112, and the lens controller 120 for obtaining, from the camera body, selection information for selecting the operable member (the focus lens 110 or the zoom lens 112) which is to be assigned to the operation ring 115. The lens controller 120 makes the operation ring 115 function as a member for operating either one of the focus lens 110 and the zoom lens 112 based on the selection information.

With the configuration, when the electromotive interchangeable lens 101 including one operation ring 115 to be used for operating at least one of the two operable members (the focus lens 110 and the zoom lens 112) is attached to the camera body 102, the lens controller 120 assigns the operating function for either the focus lens 110 or the zoom lens 112 to the operation ring 115 based on the selection information sent by the camera controller 153. With such a function, by changing the operating function to be assigned to one operation ring 115 as required, two operable members (the focus lens 110, the zoom lens 112) can be operated with one operation ring 115. Accordingly, the operation member of the electromotive interchangeable lens 101 can be formed of one operation ring 115, the structure of the electromotive interchangeable lens 101 can be simplified. In addition, the configuration of the electromotive interchangeable lens 101 having only one operation ring 115 can achieve lower cost and more miniaturization. Further, the operating function assigned to the operation ring 115 can be an operating function preferable to the user so that the convenience of the electromotive interchangeable lens 101 can be improved.

4. Other Embodiments

The other embodiments will be summarized below.

The above described embodiments are adapted to allow the user to switch the first operation mode and the second operation mode as the operation mode in the MZ and MF supporting camera body 102 in the MF mode. However, the embodiment is not limited thereto. For example, the embodiment may be adapted to automatically set (or select) the first operation mode or the second operation mode according to whether the operation member of the electromotive interchangeable lens 101 attached to the MZ and MF supporting camera body 102 is a ring or a lever. That is, when the operation member of the electromotive interchangeable lens 101 attached to the MZ and MF supporting camera body 102 is a ring (for example, the operation ring 115), the first operation mode may be automatically set to assign, to the ring, the manual focus operating function which is convenient for the user by using the ring. On the other hand, when the operation member of the electromotive interchangeable lens 101 is a lever, the second operation mode may be automatically set to assign, to the lever, the manual zoom operating function which is convenient for the user by using the lever.

In the above described embodiments, the control in the shooting mode has been described. On the other hand, in the reproducing mode, the embodiment may invalidate the zoom lens operation or the focus lens operation in response to the operation on the operation member of the electromotive interchangeable lens 101. Accordingly, this prevents occurrence of unnecessary operation when the user unintentionally touches the operation member of the electromotive interchangeable lens 101 in the reproducing mode.

Although the case where the camera side operation unit 170 has the MF/AF switch has been described in the above described embodiments, the embodiment is not limited thereto. That is, the MF/AF switch may be provided on the electromotive interchangeable lens 101. When the manual focus is selected by the operation on the MF/AF switch of the electromotive interchangeable lens 101, the lens controller 120 sets the operation mode of the electromotive interchangeable lens 101 to the MF mode. Subsequently, according to the MF mode setting, the lens controller 120 decides the assignment of the operating function to the operation ring 115. Also, the lens controller 120 sends the information on the MF mode setting to the camera controller 153. With the information on the MF mode setting, the camera controller 153 can set the operation mode of the camera body 102 to the MF mode. Similarly, when the autofocus is selected by the operation on the MF/AF switch of the electromotive interchangeable lens 101, the lens controller 120 sets the operation mode of the electromotive interchangeable lens 101 to the AF mode. Subsequently, the lens controller 120 assigns the manual zoom function to the operation ring 115 based on the AF mode setting. Also, the lens controller 120 sends the information on the AF mode setting to the camera controller 153. With the information on the AF mode setting, the camera controller 153 can set the operation mode of the camera body 102 to the AF mode.

Although the case where the manual zoom operating function or the manual focus operating function is assigned to the operation ring 115 of the electromotive interchangeable lens 101 has been described in the above described embodiments. The embodiment is not limited thereto. For example, the camera side operation unit 170 may further include a diaphragm operating button. The camera may be adapted to cause the lens controller 120 to assign the operating function for the diaphragm 116 to the operation ring 115 in response to user's pressing a diaphragm operating button on the camera body 102. When the operating function for the diaphragm 116 is assigned to the operation ring 115, the diaphragm can be adjusted by the operation on the operation ring 115.

Industrial Applicability

The embodiment is not limited to be applied to the digital camera. The embodiment may be applied to an interchangeable lens and an imaging apparatus to which the interchangeable lens can be attached such as an interchangeable lens type movie camera and an interchangeable lens type camera cellular phone.

What is claimed is:

1. An interchangeable lens attachable to a camera body which includes a camera side operation unit, the interchangeable lens comprising:
    a focus lens operable to perform focusing;
    a zoom lens operable to perform zooming;
    an operation member configured to receive a user's operation for the focus lens or the zoom lens;
    an obtaining unit configured to obtain, from the camera body, selection information used to select either the focus lens or zoom lens which is to be assigned to the operation member, the selection information indicating either a manual focus operation or an auto focus operation; and
    a controller configured to enable the operation member to function as a member for operating either the focus lens or the zoom lens based on the selection information obtained by the obtaining unit, wherein the interchangeable lens is operable in each of the following configuration:
    when the selection information obtained by the obtaining unit indicates the manual focus operation, the controller enables the operation member to function as the member for operating the focus lens, and the zoom lens is operated by the camera side operation unit; and
    when the selection information obtained by the obtaining unit indicates the manual focus operation, the controller enables the operation member to function as the member for operating the zoom lens, and the focus lens is operated by the camera side operation unit.

2. The interchangeable lens according to claim 1, further comprising a communication unit for sending information on the focus lens and the zoom lens to the camera body.

3. The interchangeable lens according to claim 1, wherein the controller assigns a function for operating the zoom lens to the operation member when the selection information is the information on the autofocus operation.

4. A camera body to which an interchangeable lens according to claim 1 is attachable, wherein
    the camera body comprises a sending unit configured to send the selection information to the obtaining unit.

5. The interchangeable lens according to claim 3, wherein the controller assigns a function for operating the focus lens to the operation member when a predetermined condition is satisfied after the completion of the autofocus operation.

6. An interchangeable lens attachable to a camera body which includes a camera side operation unit, the interchangeable lens comprising:
    a focus lens operable to perform focusing;
    a zoom lens operable to perform zooming;
    an operation member configured to receive a user operation for the focus lens or the zoom lens;
    an obtaining unit configured to obtain selection information which is output from the camera body, the selection information being used to select either the focus lens or the zoom lens for assignment to the operation member, the selection information indicating either a manual focus operation or an auto focus operation; and
    a controller configured to enable the operation member to control either the focus lens or the zoom lens based on the selection information obtained by the obtaining unit, wherein the interchangeable lens is operable such that:
    when the selection information obtained by the obtaining unit indicates the auto focus operation, auto-focusing control is performed by the camera body and the controller enables the operation member to function as the member for operating either the zoom lens or the focus lens.

7. The interchangeable lens according to claim 6, wherein the operation member is an operation ring configured to be rotated by a user to provide user input.

8. The interchangeable lens according to claim 6, wherein the interchangeable lens is operable such that:
    when the selection information obtained by the obtaining unit indicates the auto focus operation, auto-focusing control is performed by the camera body,
    before completion of the auto-focusing, the controller enables the operation member to function as the member for operating the zoom lens, and
    after completion of the auto-focusing, the controller enables the operation member to function as the member for operating the focus lens.

* * * * *